United States Patent Office 3,700,604
Patented Oct. 24, 1972

3,700,604
ACID CATALYST SYSTEM FOR FURAN RESINS OF FILLER CONTAINING ACID SALTS
Ignatius Metil, Buffalo, N.Y., assignor to Ameron, Inc.
No Drawing. Filed May 5, 1969, Ser. No. 821,964
Int. Cl. B01j 11/82
U.S. Cl. 252—428
13 Claims

ABSTRACT OF THE DISCLOSURE

Powdered acidic catalyst for furan resins is formed in situ on powdered inert filler material which may or may not contain a powdered cocatalyst dispersed therein. The acidic catalyst is a salt of a strong acid. In situ formation of the acidic salt is obtained by blending the acid and base into the filler, and uniform, homogenous dispersion of the salt is effected by blending one of them, as a liquid, into the filler whereafter the other is added, as a liquid, into the blend to produce a dry powder which is the acidic catalyst formed on and dispersed uniformly throughout the filler.

BACKGROUND OF THE INVENTION

Acid cured furan resins in admixture with various inert fillers of powdered or particulate form are widely used for fabrication of corrosion resistant processing equipment, castings, chemical resistant cements, battery sealers, carbon bonding, and as temporary binders. By the term "acid cured furan resins" is meant resins such as homopolymers of furfuryl alcohol, homopolymers of furfuryl alcohol cross-linked with furfural, copolymers of furfuryl alcohol and formaldehyde, copolymers of furfuryl alcohol and phenol, copolymers of furfural and phenol, or monomeric materials which contain the furan ring somewhere in the structure, and are capable of being cured to a final set and hardened mass by the addition thereto of an acid catalyst.

Resinification of the compositions in question is dependent upon hydrogen ion concentration and is always accelerated by heating, as is well known. Because the reaction occasioned by the addition of the acidic catalyst to the resin is exothermic, care must be taken in the selection and amount of catalyst used, else resinification may proceed too rapidly and the resultant mass may be useless. For this reason, inorganic acids such as hydrochloric acid, sulfuric acid, phosphoric acid and chromic acid generally are not used. On the other hand, inorganic salts such as zinc chloride, sodium bisulfate and mercuric chloride are often used.

In general, organic compounds ordinarily are preferred to achieve the desired properties in acid cured furan resinous products. In addition to the aromatic sulfonic acids, the aromatic sulphonchlorides such as benzene sulphonchloride, paraacetyl benzene sulphonchloride; the aliphatic amino salts of the aromatic sulphonic acids, including the ammonium salts such as ammonium paratoluene sulphonate, dimethyl amino benzene sulphonate, diethyl amino toluene sulphonate, ammonium benzene sulphonate and disulphonate, ammonium phenol sulphonate, ammonium naphthalene sulphonate and disulphonate, ammonium anthracene sulphonate and disulphonate, ammonium sulphanilate; the aromatic amino salts of aromatic sulphonic acids such as the aniline salt of benzene sulphonic acid, the aniline salt of paratoluene sulphonic acid, and the pyridine salt of phenol sulphonic acid; the organic salts of strong inorganic acids such as glyoxal sulphate; the metallic salts of chlorsulphonic acid such as sodium chlorsulphonate and potassium chlorsulphonate; the aliphatic and aromatic salts of strong inorganic acids such as triethanolamine chloride, aniline hydrochloride, ammonium sulphamate, pyridine sulphate, pyridine bisulphate, and aniline sulphate; the amino salts of sulphanilic acid such as aniline sulphanilate and pyridine sulphonate; the ferric salts of sulphonic acids such as ferric trichlorobenzene; acid anhydrides such as phosphoric anhydride and maleic anhydride; the ammonium salts of alkane sulphonic acids such as ammonium ethane sulphonate; the ferric salts of sulphonic acids such as ferric benzene sulphonate and ferric toluene sulphonate; the ammonium salts of organic substituted inorganic acids such as ammonium ethyl phosphate, have been used as catalysts for furan resins.

The inorganic salts and organic compounds mentioned above are advantageously mixed with the inert filler and if used in sufficiently small particle size, uniformly distributed throughout the filler, excellent results may be obtained. However, in preparing such catalyst-fillers, pulverization and screening are required to assure that the acidic catalyst is present in sufficiently small particle size as will not cause local overheating during resin conversion such as results in unevenly cured products. If the acidic catalyst is a liquid, it will tend to drain down to the bottom of the container if not used immediately, with the resultant formation of lumps in the catalyst-filler so segregated. Reblending will of course be required in order to redistribute the catalyst, but the lumps, which may cause hot spots and local overheating during resin conversion thereby producing an unevenly cured product, are difficult to disperse.

In addition, some solid acidic catalysts tend to lose activity upon storage. Para-toluenesulfonic acid, for example, tends to absorb moisture from the air and, in general, catalyst-fillers which contain hydrochloric acid or acid chlorides will hydrolyze giving off the acid upon storage.

BRIEF SUMMARY OF THE INVENTION

The present invention is directed to the method of producing an acidic catalyst-filler for furan resins possessing none of the disadvantages of the catalyst-fillers of the prior art, the method effecting a uniform distribution of the catalyst on an inert filler, without formation of any large catalyst particles or lumps which may act as hot spot sites which would produce an unevenly cured mass.

The method involves the addition, in liquid form, of one component of a salt-forming system to powdered inert filler and the uniform blending of such component into the filler. The filler is present in amount sufficient to completely adsorb the liquid component, whereafter the other component of the system is added in liquid form to form the salt directly upon and uniformly distributed throughout the filler.

DETAILED DESCRIPTION OF THE INVENTION

In the following examples, the resin used in each instance is a homopolymer of furfuryl alcohol cross-linked with furfural according to Example I of my prior Pat. 3,168,494, although it is to be understood that the acidic catalyst-fillers according to this invention are useful in conjunction with furan resins in general. The methods of testing compressive strength and chemical resistance are, in all examples, according to ASTM C 579–65T and C 267–65 respectively. In what follows, it will be understood that all mixing ratios and proportions are by weight. Because acetone resistance determines the cross-linking effect of furan resin best, it is used herein for determining effectiveness of catalyst to produce chemically resistant samples.

EXAMPLE I

To 63.1 parts finely pulverized silicon dioxide and 36.8 parts sand constituting the inert filler and which passes through a 20 mesh screen are added .643 part of liquified para-toluenesulfonic acid, with mixing, until the para-toluenesulfonic acid is uniformly dispersed throughout the sand filler, containing 1.99 parts of sodium bisulfate and 1.99 parts coke flour. Liquification of the para-toluenesulfonic acid may be effected by heat, although liquified forms of this component, due probably to the presence of isomers, are available. After the thorough mixing and dispersion, .357 part of aniline are slowly added while mixing is continued. The resultant catalyst-filler is a dry powder, free of lumps, 100% passing through a 20 mesh screen.

EXAMPLE II

Resin cured by admixture with the catalyst-filler of Example I was compared to a "standard" mix. The standard mix is chosen because it is known to give excellent chemical resistance in commercial applications and consists of the same inert filler as in Example I, less the catalyst thereof. The results are as follows:

TABLE 1

|  | Example II | Standard |
|---|---|---|
| Mixing ratio, powder:resin | 3:1 | 3:1 |
| Pot life, minutes | 12 | 15 |
| Compressive strength, p.s.i., after 7 days cure at 74°±3° F | 8,046 | 8,025 |
| Chemical resistance=compressive strength after 7 days cure at 74°±3° F. and 7 days in acetone | 9,277 | 9,192 |

EXAMPLE III

When para-toluenesulfonic acid is used as catalyst in amount of greater than about 4% by weight of resin, the mixture cures too rapidly. To increase the compressive strength of the cured product, it is possible to use relatively large amounts of para-toluenesulfonic acid-derived salt.

To 62.25 parts coke flour and 32.25 parts of sand are added 3.6 parts of liquified para-toluenesulfonic acid, with mixing to disperse the acid until same is completely adsorbed by and uniformly dispersed throughout the filler. With continued mixing, 1.98 parts aniline are slowly added to produce the catalyst-filler.

To the same filler as above, 3.6 parts of para-toluenesulfonic acid is added, without the addition of aniline, for control.

Preparation of cured resin from these two catalyst-fillers is as follows:

TABLE 2

|  | Example III | Control |
|---|---|---|
| Mixing ratio, powder:resin | 2:1 | 2:1 |
| Pot life, minutes | 81 | (¹) |
| Compressive strength, p.s.i., after 7 days cure cure at 74°±3° F | 9,575 | |
| Chemical resistance, p.s.i., 7 days cure at 74±3° F. and 7 days in acetone immersion | 9,676 | |

¹ Impossible to mix, cures instantly.

EXAMPLE IV

Preferred catalyst-filler systems employ, in addition to the acidic salt derived from para-toluenesulfonic acid and aniline, pulverized sodium bisulfate as a co-catalyst. In the following table, the catalyst-filler of the example was prepared according to the procedure previously described; control 1 was prepared with reduced amount of para-toluenesulfonic acid to obtain the same pot life as in the example; and control 2 was prepared with the same amount of para-toluenesulfonic acid as in the example, as follows:

TABLE 3

|  | Example IV | Control 1 | Control 2 |
|---|---|---|---|
| Mixing ratio, powder:resin | 2:1 | 2:1 | 2:1 |
| Percent NaHSO₄ in powder | 2.50 | 2.50 | 2.50 |
| Percent aniline in powder | .526 | 0 | 0 |
| Percent p-TSA in powder | .976 | .25 | .976 |
| Pot life, minutes | 13 | 13 | 2 |
| Compressive strength, p.s.i., after 7 day cure at 74±3° F | 9,650 | 2,675 | (¹) |
| Chemical resistance, p.s.i., after 7 day cure at 74±3° F. and 7 days in acetone immersion | 11,752 | 3,185 | |

¹Sample cannot be prepared.

EXAMPLE V

Because of their stability, salts formed from nitrogenous base compounds and a strong acid are preferred. In each of the following, the procedure for forming the acidic catalyst in situ as discussed above was used.

TABLE 4

| Example | 1 | 2 | 3 | 4 | 5 | 6 | 7 |
|---|---|---|---|---|---|---|---|
| Mixing ratio: powder to resin | 2:1 | 2:1 | 2:1 | 2:1 | 2:1 | 2:1 | 2:1 |
| Percent catalyst in filler pyridine | .472 | | | | | | |
| 4,4'-methylene dianiline | | .546 | | | | | |
| Tetraethylenepentamine | | | .30 | | | | |
| Aniline | | | | .524 | | .556 | .731 |
| Phenylenediamine eutectic mix | | | | | .458 | | |
| p-TSA | 1.028 | .953 | 1.20 | .973 | 1.042 | | |
| H₂SO₄ | | | | | | | .770 |
| Benzenesulfonic acid | | | | | | .944 | |
| NaHSO₄ | 2.5 | 2.5 | 2.5 | 2.5 | 2.5 | 2.5 | 2.5 |
| Pot life, minutes | 10 | 10 | 8 | 8 | 7 | 7 | 8 |
| 9 min. rise, ° F | 44 | 36 | 55 | 49 | 76 | 51 | 50 |
| Max. recorded temp., ° F | 136 | 197 | 164 | 228 | 208 | 222 | 202 |
| Compressive strength, p.s.i., after 7 day cure at 74±3° F | 6,847 | 10,064 | 9,310 | 11,550 | 10,435 | 10,489 | 9,374 |
| Chemical resistance, p.s.i., after 7 day cure at 74±3° F. plus 7 days in acetone | 8,111 | 11,253 | 10,669 | 12,527 | 11,943 | 11,752 | 10,934 |

EXAMPLE VI

The examples above employ, in general, salt-forming system involving substantially stoichiometric amounts of the acid and base. It is possible, however, to deviate somewhat from strict stoichiometric relationship, as evidenced by the following:

TABLE 5

| Example | 1 | 2 | 3 | 4 | 5 | 6 |
|---|---|---|---|---|---|---|
| Mixing ratio: powder to resin | 2:1 | 2:1 | 2:1 | 2:1 | 2:1 | 2:1 |
| Percent catalyst in filler: | | | | | | |
| NaHSO₄ | 5.0 | 2.1 | 2.5 | 2.5 | 2.5 | 2.5 |
| Aniline | .924 | .524 | .576 | .524 | .524 | .524 |
| p-TSA | .973 | 1.459 | .976 | 1.946 | .976 | 1.074 |
| Percent aniline in resin | | | | | .8 | |
| Pot life, minutes | 5 | 5 | 10 | 6.5 | 9 | 8 |
| 9 min. rise, ° F | 125 | 138 | 31 | 105 | 42 | 50 |
| Max. recorded temp., ° F | 260 | 246 | 206 | 264 | 214 | |
| Compressive strength, p.s.i., after 7 day cure at 74±3° F | 10,701 | 12,048 | 10,563 | 12,973 | 10,806 | 11,433 |
| Chemical resistance, p.s.i., after 7 day cure at 74±3° F. and 7 days in acetone | 12,314 | 13,397 | 12,102 | 13,694 | 12,229 | 13,057 |

In all of the above examples, the resin used consists of a neutralized condensation homopolymer of furfuryl alcohol of a viscosity of about 45–50 poises formed by polymerizing furfuryl alcohol in an acidic environment free of furfural, and furfural in amount of about 43% by weight of the homopolymer, according to my prior patent. The resin is of pH of about 4.5–5.5, it having been found that a pH within this range lends great stability to the resin, i.e., it may be stored for many years under conditions of normal temperature variation without degradation. It will be appreciated that the resin may be adjusted to a higher pH, but in the interest of economy it is desirable to utilize the range specified since less catalyst is necessary in order to lower the pH to that value required under the conditions of application as will effect the cure of the resin.

With respect to this, it will be appreciated that the pH of the resin-catalyst mixture necessary to produce adequate curing will depend upon the curing temperature and the pot life required. Thus, when curing is to take place at elevated temperatures, the amount of catalyst used ordinarily will represent that amount required to provide a pH of about 3.5–4, whereas for room temperature curing, a pH of from less than 1 to about 3 will ordinarily be required.

The in situ formation of the acidic salt may be performed by adding either of the components of the salt-forming system, first, but when p-toluensulfonic acid, the preferred strong acid component of the salt-forming system, is used it is desirable to add it first whereafter the aniline, the preferred nitrogenous base component, is added. In any event, the components of the salt-forming system are added in proportion to that amount of filler which will obtain the desired pH of the resin in the final mix and in every instance in such minor amount relative to the filler of the catalyst-filler as will assure that the first-added component will be adsorbed by the particulate filler so that it may be dispersed uniformly throughout the filler.

The effects of deviating from stoichiometric amounts of the components of the salt-forming system may be seen from Table 5. Thus, Table 5, Examples 3 and 5 of which illustrate slight excesses of aniline and strong acid respectively, shows that the temperature rise after 9 minutes, a good indication of comparative pot life and workability, is less on the excess aniline side whereas the maximum recorded temperature due to the catalytic action is about the same in the two examples. Table 5, Example 1, employing a greater excess of the strong acid component than Example 5, shows a reduction in pot life and increase in both the 9 minute temperature rise and the maximum temperature leading to increased strength.

Table 5, Example 4, shows substantially increased amount of strong acid component but with sufficient excess aniline to obtain a reasonable pot life. In order to avoid the presence of liquid in the catalyst-filler, part of the aniline is introduced into the resin, leaving an excess of strong acid component in the catalyst-filler. The increased strong acid component yields higher 9 minute temperature rise and maximum temperature as compared to Examples 3, 5 and 6, and correspondingly greater compressive strength.

Example 1 of Table 5 shows the addition of excess aniline to obtain a reasonable pot life in conjunction with the substantial amount of co-catalyst used whereas in Example 2, the amount of co-catalyst is required to be reduced considerably in order to assure reasonable pot life with the substantial excess of strong acid component employed.

What is claimed is:

1. A powdered and essentially dry catalyst-filler for furan resins capable of producing a hardened, set and cured mass when admixed with furan resin in amount sufficient to impart pH of from less than 1 to about 4 thereto, said catalyst-filler consisting essentially of a major amount of particulate inert filler having a minor amount of acidic catalyst uniformly dispersed therethroughout, said acidic catalyst being a powdered acidic salt formed in situ on the particles of particulate filler.

2. The catalyst-filler according to claim 1 wherein the acidic catalyst consists of the acidic salt of a nitrogenous base compound and a strong acid.

3. The catalyst-filler according to claim 2 wherein the nitrogenous base compound is aniline and the strong acid is para-toluenesulfonic acid.

4. The catalyst-filler according to claim 1 wherein said acidic catalyst consists of co-catalyst and said in situ formed powdered acidic salt, said in situ formed powdered acidic salt being the acidic salt of a nitrogenous base compound and a strong acid.

5. The catalyst-filler according to claim 4 wherein said co-catalyst is sodium bisulfate, said nitrogenous base compound is aniline, and said strong acid is para-toluenesulfonic acid.

6. The method of preparing a powdered and essentially dry catalyst-filler for furan resins in which the catalyst component of the catalyst-filler consists of powdered acidic salt of a strong acid, the catalyst component of the catalyst-filler being capable of initiating conversion of furan resins at room temperature to a set, infusible mass, which comprises the steps of:
    (a) blending one component of the powdered acidic salt-forming system in liquid form into particulate inert filler material, while maintaining the proportion of inert filler to said one component such that the latter is completely adsorbed by and uniformly distributed throughout the former, and
    (b) blending the other component of the powdered acidic salt-forming system in liquid form into the admixture of step (a) so as to form the powdered acidic salt in situ on the inert filler particles.

7. The method according to claim 6 wherein the components of the powdered acidic salt-forming system are a nitrogenous base compound and the strong acid.

8. The method according to claim 7 wherein the nitrogenous base compound is aniline and the strong acid is para-toluenesulfonic acid.

9. The method according to claim 8 wherein the catalyst consists of said organic acidic salt and sodium bisulfate.

10. The catalyst-filler as defined in claim 3 wherein said para-toluenesulfonic acid is present in amount of about 3.6% by weight of filler and said aniline is present in substantially stoichiometric amount with respect to para-toluenesulfonic acid.

11. The catalyst-filler according to claim 5 wherein said sodium bisulfate is present in amount of about 2–5% by weight of filler, said para-toluenesulfonic acid is present in amount of about 0.6–2.0% by weight of filler, and said aniline is present in amount of about 0.3–1.0% by weight of filler.

12. The method according to claim 8 wherein said para-toluenesulfonic acid is present in amount of about 3.6% by weight of filler and said aniline is present in substantially stoichiometric amount with respect to para-toluenesulfonic acid.

13. The method according to claim 9 wherein said sodium bisulfate is present in amount of about 2–5% by weight of filler, said para-toluenesulfonic acid is present in amount of about 0.6–2.0% by weight of filler, and said aniline is present in amount of about 0.3–1.0% by weight of filler.

(References on following page)

References Cited

UNITED STATES PATENTS

| | | | |
|---|---|---|---|
| 2,499,275 | 2/1950 | McWhorter | 252—426 X |
| 2,669,552 | 2/1954 | Seymour et al. | 252—436 |
| 2,689,237 | 9/1954 | Seymour et al. | 260—37 X |
| 3,168,494 | 2/1965 | Metil | 260—67 |
| 3,184,814 | 5/1965 | Brown | 260—37 X |
| 3,205,191 | 9/1965 | Watson et al. | 260—67 X |
| 3,487,043 | 12/1969 | Crudus, Jr. | 260—41 |

DANIEL E. WYMAN, Primary Examiner

P. E. KONOPKA, Assistant Examiner

U.S. Cl. X.R.

252—410, 426, 430, 441, 444; 260—37 R, 47 R, 51 R, 67 F, 67 FA, 88.5, 91.3 R